United States Patent [19]

Eckman

[11] Patent Number: 4,591,299
[45] Date of Patent: May 27, 1986

[54] RAPID FEED APPARATUS FOR AUTOMATIC FEED DRILLS OR THE LIKE

[75] Inventor: Richard E. Eckman, Houston, Tex.

[73] Assignee: Dresser Industries, Inc., Dallas, Tex.

[21] Appl. No.: 612,500

[22] Filed: May 21, 1984

[51] Int. Cl.$^4$ .............................................. B23B 45/04
[52] U.S. Cl. ..................................... 408/1 R; 173/19;
173/154; 408/11; 408/102; 408/137
[58] Field of Search ................ 408/1 R, 137, 141, 10,
408/11, 102, 130, 14, 13; 173/19, 32, 154;
10/136 R

[56] References Cited

U.S. PATENT DOCUMENTS 4,050,835  9/1977  Womack .............................. 408/11
4,418,767  12/1983  Vindez ................................. 173/19

OTHER PUBLICATIONS

A. B. Quackenbush Co. Manual for Drill Series 15QDA-RA-SU., Price to Jan. 28, 1983.

Primary Examiner—Z. R. Bilinsky
Attorney, Agent, or Firm—Richard M. Byron; Roy L. Van Winkle

[57] ABSTRACT

The automatic feed drill includes a spindle mounted therein for rotating and reciprocating movement. The spindle is rotated by a spindle rotation gear that is engaged with the main drive gear which is ultimately driven by an air motor or the like. The feed and retraction movement (reciprocation) is caused by a spindle feed gear that is threaded onto the spindle. The spindle feed gear is engaged with a feed gear which, during normal feed movement, is driven by the main drive gear, and during retraction and rapid feed movement, is shifted into a position wherein the feed gear is prevented from rotating. During rapid feed the motor direction is reversed by a reversing valve. The apparatus also includes a yieldable stop device that holds the feed gear stopped during retraction and rapid feed movement. In the event that excessive torque is encountered, such as by a lower collar on the spindle engaging the housing or the drill bit encountering the work piece during rapid feed, the yieldable stop member rotates at the same speed as the spindle feed gear and thus, prevents further retraction or feeding of the spindle and avoids damage to the drill.

6 Claims, 7 Drawing Figures

RAPID FEED APPARATUS FOR AUTOMATIC FEED DRILLS OR THE LIKE

BACKGROUND OF THE INVENTION

This invention relates generally to improved feed apparatus for automatic drills or the like. More particularly, but not by way of limitation, this invention relates to an improved rapid feed apparatus including yieldable stop apparatus located in the housing for stopping the rapid feeding movement of the spindle.

This invention is an improvement to the invention disclosed and claimed in U.S. patent application Ser. No. 547,702, filed 10/31/83 and assigned to the same assignee as this application.

One of the problems encountered in the use of automatic drills has been their inability to move the drill bit rapidly to the work piece and stop to prevent damage to the drill, the drill bit, or to the work piece. Rapid retraction of the drill bit is known as discussed hereinafter, but to applicant's knowledge, successful rapid feed for right-angle drills has not been previously accomplished. Successful rapid feed is important because it decreases production time for drilling a series of holes by almost one-half and, thus, increases production with a decrease in product cost.

In one apparatus manufactured in the past, a contact actuated valve is provided that engages a collar or other abutment on the spindle during the retraction movement, shifting the drill into automatic feed movement so that the drill continues to alternate between feed and retraction movement until the operator stops the drill. Also, it has been proposed to provide a stop on the spindle that engages the drill housing causing the drill motor to stall. Manifestly, this has not been very successful in that damage can occur to the various portions of the gear drive mechanism in the drill.

Feeding and retraction of automatic drills is normally accomplished through speed relationships as will appear hereinafter. Motor reversal in such drills is not required and, therefore, is not usually provided since drill bits are manufactured to cut or drill with rotation in one standard direction.

Accordingly, one object of this invention is to provide rapid feed apparatus for automatic feed drills wherein the feeding movement is stopped when the drill bit encounters the work piece or in the event that high torque loads are encountered during rapid feeding to prevent damage to the drill.

SUMMARY OF THE INVENTION

This invention provides improved rapid feed apparatus for automatic feed drills that includes a housing, a rotatable tool spindle located for reciprocating movement in the housing, and driving means located in the housing operably connected with the spindle for rotating and reciprocating the spindle in feeding and retraction movements. The driving means includes a spindle rotation gear engaged thereon. A spindle feed gear is engaged with the spindle to cause reciprocating movement of the spindle. A main drive gear that is driven by a reversible air motor or the like is engaged with the spindle rotation gear to cause rotation thereof. A feed gear engages the spindle feed gear and is moved in and out of engagement with the main drive gear. The feed gear, when driven by the main drive gear, causes rotation of the spindle feed gear to move the spindle in normal feeding movement. Shift apparatus is connected to the feed gear and is engageable with the spindle for moving the feed gear out of driving engagement with the main drive gear. When not driven by the main drive gear, the feed gear causes the spindle to be moved in retraction movement, except when the motor is running in reverse. When the motor is in reverse, the feed gear is yieldably locked and causes rapid feed movement of the spindle. A yieldable stop device is located in the housing that engages and prevents rotation of the feed gear when the feed gear is moved out of driving engagement with the main drive gear. The stop apparatus is yieldable when a predetermined torque is placed on the feed gear by the spindle feed gear during retraction or rapid feed movement so that the spindle feed gear rotates at the same speed as the spindle, thereby stopping the retraction or rapid feed movement of the spindle. A reversing valve is also provided for reversing the direction of rotation of the motor.

BRIEF DESCRIPTION OF THE DRAWING

The foregoing and additional objects and advantages of the invention will be more apparent when the following detailed description is read in conjunction with the accompanying drawing, wherein like reference characters denote like parts in all views and wherein.

DETAILED DESCRIPTION OF THE PREFERRED EMBODIMENT

Figure 1:
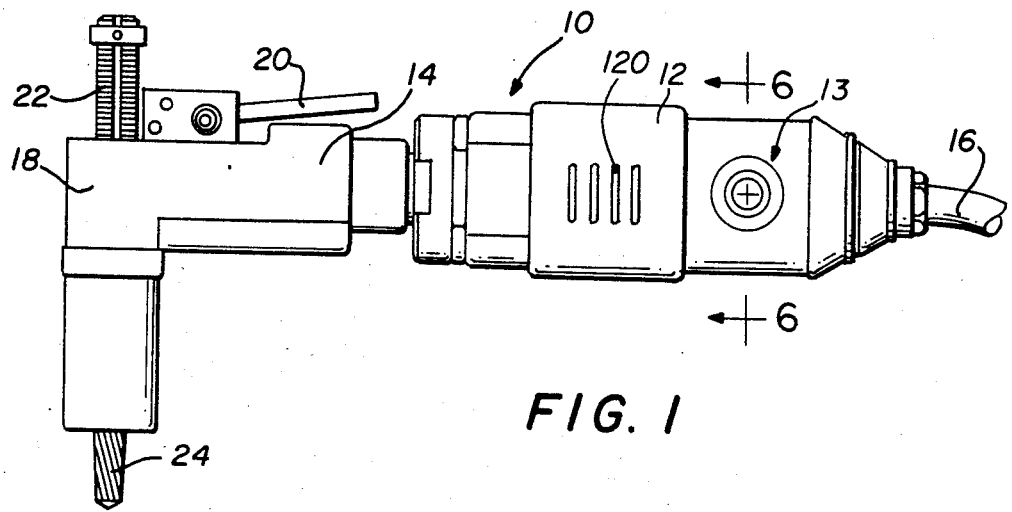
FIG. 1 is an elevation view of an automatic feed drill that is constructed in accordance with the invention.

Referring to the drawing, and to FIG. 1 in particular, shown therein and generally designated by the reference character 10, is an automatic feed drill that is constructed in accordance with the invention. The drill 10 includes a motor portion 12, which in this instance, is illustrated as being a pneumatic motor, although other types may be utilized if desired. A reversing valve 13 is located in the drill 10 in a position to control the direction of rotation of the motor 12. The drill 10 also includes a feed head 14, which is illustrated as being a right angle feed head. Connected to the motor 12 is a pneumatic conduit 16 for providing the appropriate air supply to the motor 12 through the valve 13.

The feed head 14 includes a housing 18 on which is pivotally mounted a shift lever 20. The shift lever 20, when placed in the appropriate position, will cause a spindle 22 and a drill bit 24 attached to the lower end of the spindle to either be fed toward a work piece 26 (see FIG. 2), or retracted therefrom as is appropriate.

Figure 2:
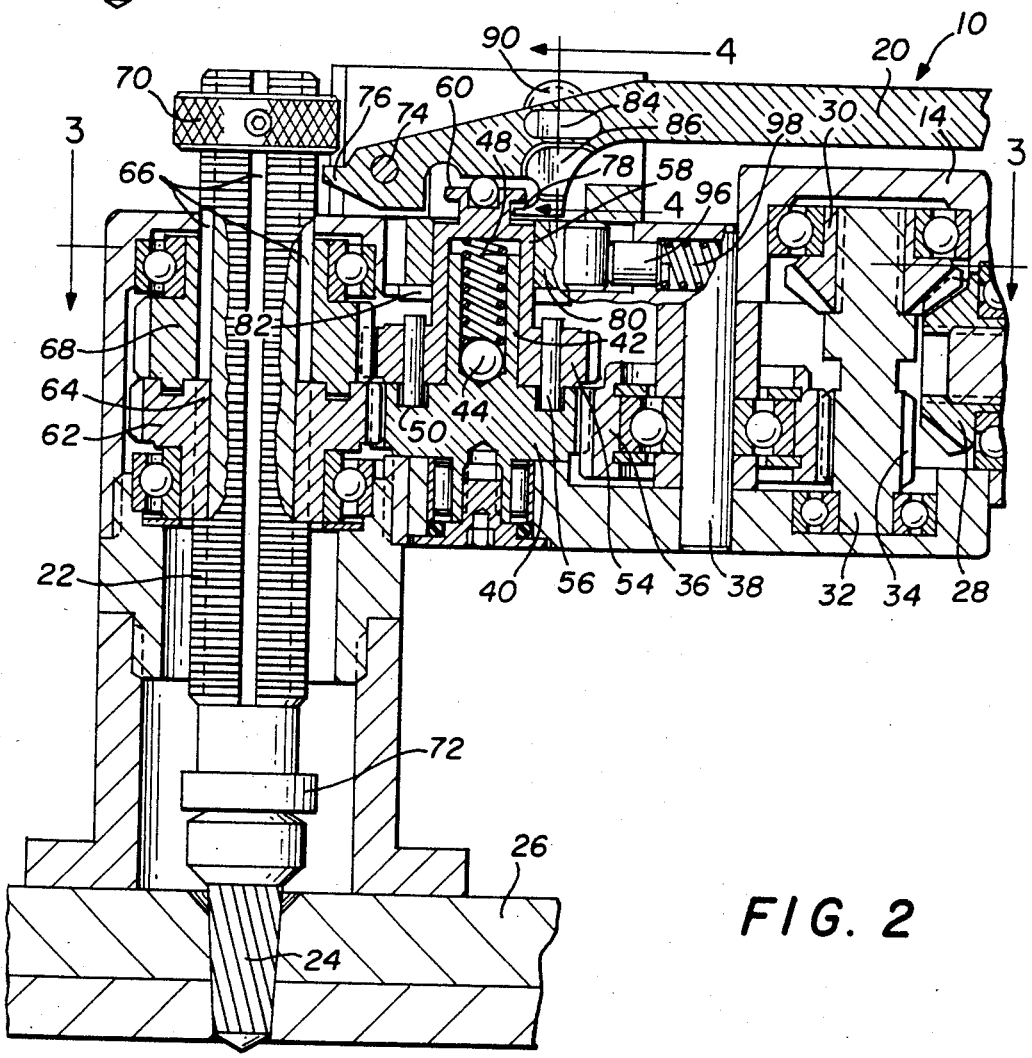
FIG. 2 is an enlarged view, partially in cross-section, of a portion of the drill illustrated in FIG. 1 and illustrates components thereof that are constructed in accordance with the invention.

Referring to FIG. 2, it can be seen therein that the drill 10 is located adjacent to the work piece 26 as required for drilling a hole therein with the drill bit 24. At the right hand side of FIG. 2, there can be seen a bevel gear 28 that is in mesh with a bevel gear 30 that is mounted on a shaft 32. The shaft 32 includes a spur gear portion 34.

The spur gear portion 34 drives an idler gear 36, that is mounted for rotation on a shaft 38 located in the housing 14. The idler gear 36 drives a main drive gear 40.

The main drive gear 40 is mounted for rotation in the housing and includes an upwardly extending hollow portion 42 that has in its interior a ball 44 and spring 48. In the upper surface of the main drive gear 40, there is provided an annular recess 50 having at least one lug 52 (see FIG. 5) located therein.

The main drive gear 40 is shown in FIG. 2 in driving relationship with a feed gear 54. The feed gear 54 includes pins 56 that extend from the upper and lower surfaces thereof. The lower end of the pins 56 extend into the annular recess 50 in driving engagement with the lugs 52 when the feed gear 54 is in position illustrated in FIG. 2.

The feed gear 54 has an upwardly extending portion 58 of reduced diameter that fits in telescoping relationship with the upper portion 42 of the main drive gear 40. The spring 48, which is disposed in the interior of the gear 40, has one end in engagement with the upper end of the feed gear 54, and the other end in engagement with the ball 44 that is resting in the gear 40 for purposes that will be explained hereinafter. The uppermost end of the gear 54 is provided with an annular shoulder 60.

In addition to the feed gear 54, the main drive gear 40 also drives a spindle rotation gear 62. The spindle rotation gear 62 has an interior that is sized to slip over the spindle 22 and includes lugs or keys 64 that are disposed in the four slots 66 formed longitudinally in the exterior of the spindle 22. Due to the engagement between the lugs 64 and the spindle 22 in the slots 66, it is possible to transmit rotational motion to the spindle 22 while permitting the spindle 22 to move longitudinally through the spindle rotation gear 62.

Also mounted on the spindle 22 is a spindle feed gear 68 that has its interior threaded to mate with the threads on the exterior of the spindle 22. It will be noted that the spindle feed gear 68 is in mesh with the feed gear 54 in the feed position of the drill 10 illustrated in FIG. 2.

Mounted on the spindle 22 is an upper collar 70 which serves to limit the amount that the spindle 22 is fed downwardly, and thus control the depth of the hole drilled by the bit 24. At the lower end of spindle 22 there is provided a second collar or abutment 72 that engages the lower end of the housing 14 during retraction movement of the spindle 22 to limit the amount of retraction movement of the spindle 22.

The shift lever 20 is pivotally mounted on the housing 14 by a pivot pin 74. Adjacent to the pivot pin 74 is a protuberance 76 which, as can be seen in FIG. 2, is positioned so as to be engaged by the abutment or collar 70 that is secured to the upper end of the spindle 22.

Figure 5:
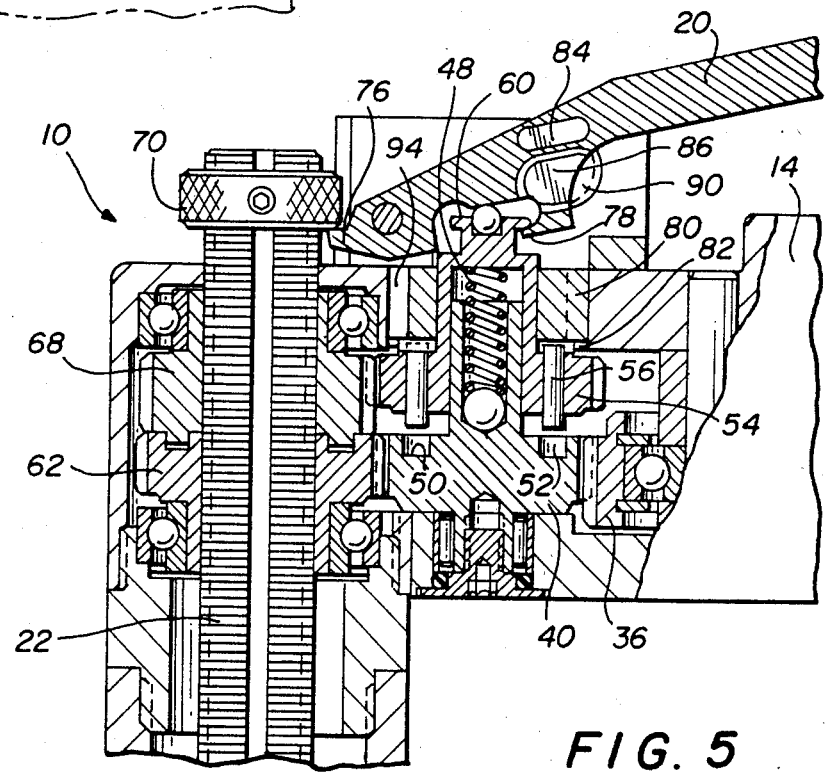
FIG. 5 is a cross-sectional view similar to FIG. 2, but illustrating the various components of the drill in other operating positions.

The shift lever 20 also includes a tang 78 that projects underneath the annular shoulder 60 on the feed gear 54. The tang 78 as shown in FIG. 5, engages the shoulder 60 upon upward movement of the lever 20 to lift the feed gear 54 out of driving engagement with the main drive gear 40. In order to stop the rotation of the feed gear 54, there is provided an annular stop member 80 that encircles the upper end of the feed gear 54. The stop member 80 has in its lower surface a recess with lugs 82 arranged to engage the upper ends of the pins 56 that are carried by the feed gear 54. Accordingly, when the feed gear 54 is moved into the position illustrated in FIG. 5, that is, the retract position, it can be seen that the upper end of the pins 56 engage the lugs 82 on the bottom of the stop member 80.

Figure 4:
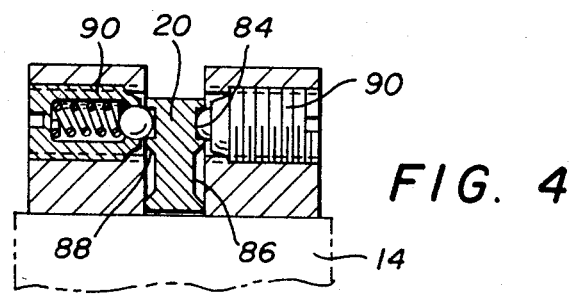
FIG. 4 is an enlarged partial cross-sectional view taken generally along the line 4—4 of FIG. 2.

The lever 20 is provided on each side with a pair of recesses 84 and 86. The recesses may be more clearly seen in FIGS. 4 and 5. As shown in FIG. 4, the upper recess 84 is generally provided with a right angled wall while the lower recess 86 is provided with an angularly disposed wall 88. A pair of spring-loaded detents 90 are positioned in the housing 14 so that they will be disposed in the upper recesses 84 when the feed gear 54 is in driving relationship with the main drive gear 40, and will be disposed in the lower recesses 86 when the drive gear 54 is in engagement with the stop member 80 and out of driving engagement with the main drive gear 40.

The surface 88 is tapered or at an angle because the feed velocity of the spindle 22 may be relatively low so that the collar 70 engages the protuberance 76 at a very low speed, causing the lever 20 to be moved very slowly. With the angular disposition of the surface 88, the detents 90 force the lever to snap upwardly into the position illustrated in FIG. 5 from the FIG. 2 position, and thus make certain that the feed gear 54 moves quickly and completely out of engagement with the main drive gear 40 and into engagement with the stop member 80.

Figure 3:
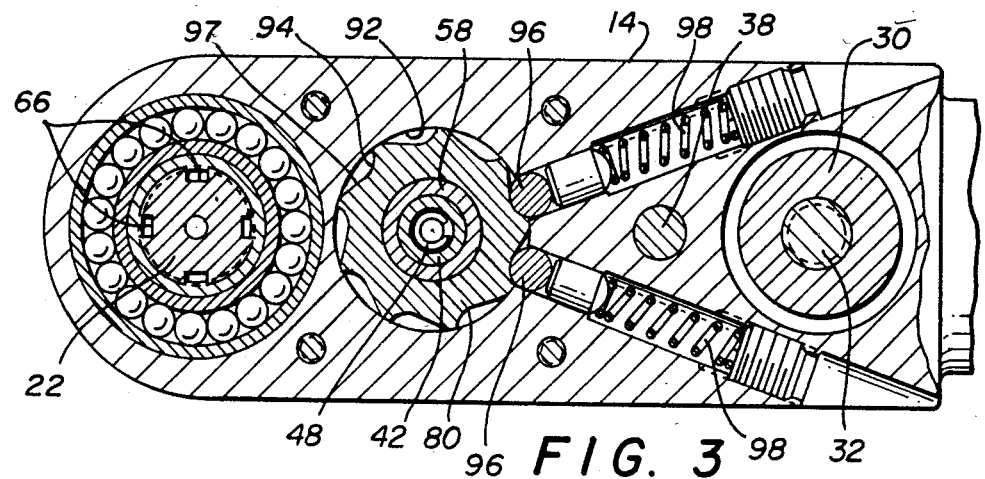
FIG. 3 is a cross-sectional view taken generally on the line 3—3 of FIG. 2.

The stop member 80 is rotatably located in an opening 92 formed in the housing 14 as shown most clearly in FIG. 3. It will be noted that the exterior of the stop member 80 is provided with a plurality of circumferentially spaced recesses 94 that are sized to receive a pair of detents 96.

As clearly shown in FIG. 3, the detents are urged into resilient engagement with the stop member 80 by springs 98. Thus, it can be seen that if the feed gear 54 is caused to rotate when the pins 56 are in engagement with the lugs 82 of the stop member 80, the stop member 80 will also rotate displacing the detents 96 against the force of the springs 98 somewhat similar to a ratcheting action.

To reduce the possibility of damage to either the drill bit 24 or to the workpiece, the stop member 80 has a sloping surface 97 in each recess 94. The surfaces 97 permit stop member 80 to retract the detents 96 more easily and, thus, require less torque load when the drill 10 is in reverse with rapid feed movement of the spindle 22 toward the workpiece.

Figure 6:
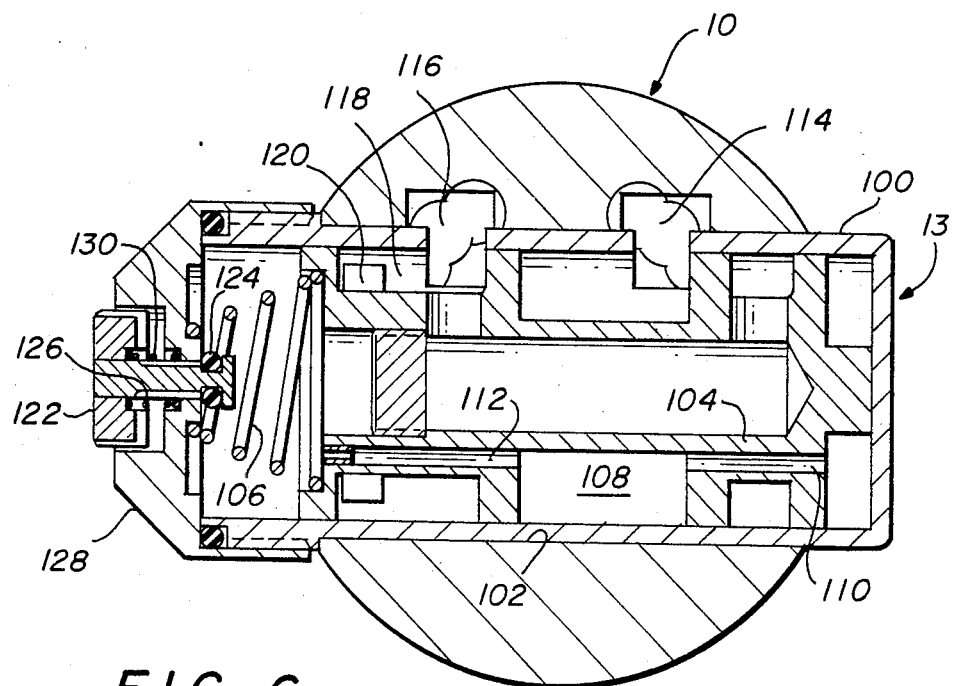
FIG. 6 is an enlarged cross-sectional view of the reversing valve taken generally along the line 6—6 of FIG. 1.
Figure 7:
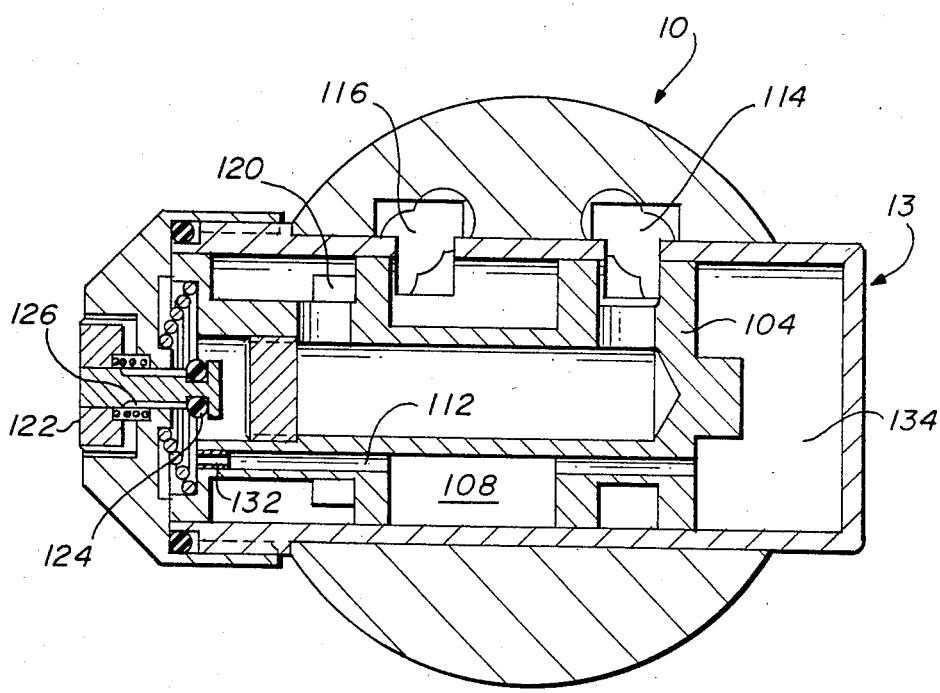
FIG. 7 is a view, similar to FIG. 6, but showing the valve in the motor reversing position.

FIGS. 6 and 7 illustrate the structure and operation of the motor reversing valve 13. Valve 13 includes an elongated hollow body 100 that is positioned in a transverse bore 102 in the drill 10. A valve member 104 is slidable in the body 100 in response to pressure applied thereto as will be explained. The valve member 104 is normally biased by a spring 106 toward the position shown in FIG. 6, that is, toward the position wherein the drill bit 24 is rotating in the proper direction to drill.

Air pressure is applied in an annular chamber 108 that is defined by the body 102 and the valve member 104. It will be noted that as illustrated in FIG. 6, the valve 13 is pressure balanced since fluid can pass through passageways 110 and 112 and exert pressure on each end of the valve member 104. Thus, it is only necessary for the spring 106 to exert enough force to overcome the friction within the valve 13 to move valve member 104 to the position shown.

As illustrated, the annular chamber 108, which has air pressure therein, is connected to a forward rotation passageway 114 which direct the supply air to the motor 12. Air exhausted from the motor 12 passes through the reverse rotation passageway 116, through annular space 118, defined between the valve member 104 and the housing 102, into exhaust passageway 120 (see also FIG. 1) from which the gas is exhausted to the atmosphere.

The valve 13 also includes a pressure release button 122 that carries a seal 124 which closes bore 126 extending through the top end 128 of the valve 13. A spring 130 constantly urges the pressure release button 122 into the position illustrated in FIG. 6 wherein the seal 124 closes the bore 126 and thus prevents the escape of pressurized air from the valve 13.

In FIG. 7, the pressure release button 122 is depressed, moving the seal 124 away from the bore 126 and permitting the escape of air therethrough. A restriction 132 is located in the passageway 112 so that the pressurized gas from the chamber 108 cannot quickly resupply the gas in the left end of the valve 13, and therefore the gas in the right end 134 of the valve 13 moves the valve member 104 to the left, bringing the annular chamber 108 into alignment with the reverse rotation passageway 116.

In this condition, pressurized air is supplied through the reverse rotation passageway 116 to the motor 12, reversing the direction of rotation thereof. Air exhausted from the motor passes through the forward rotation passageway 114 into the interior of the valve member 104 and outwardly through the normal exhaust passageways 120 to the atmosphere. The motor 12 will, of course, be operating in the reverse direction, that is, in the direction opposite the direction in which the drill bit 24 would make a hole in the work piece 26. This direction of motor rotation will continue so long as the pressure release button 122 is held in the depressed condition illustrated in FIG. 7.

OPERATION OF THE PREFERRED EMBODIMENT

With the spindle 22 retracted upwardly to a position wherein the drill bit 24 does not contact the work piece 26, the air motor 12 is started in the reverse direction with the valve 13 in the position illustrated in FIG. 7. The shift lever 20 is placed in the position illustrated in FIG. 5. When in this position, the shift lever 20 holds the feed gear 54 locked and out of driving engagement with the main drive gear 40 which is being rotated through the gear train. The spindle 22 and drill bit 24 are being rotated in the reverse direction through the spindle rotation gear 62. The feed gear 54 is locked also locking the spindle feed gear 68. Since the spindle feed gear 68 is threaded to the spindle 22, the spindle 22 and drill bit 24 are fed downwardly in rapid feed movement toward the work piece 26.

The rapid feed movement continues until the drill bit 24 engages the work piece 26 or some other cause of torque is encountered. When this occurs, rapid feed stops because the gear 54 is rotated by and at the same speed as the gear 68. Rotation of the gear 54 causes rotation of the stop member 80 and, through the engagement between the detents 96 and the stop member 80 causes considerable noise alerting the operator that the work piece has been reached. It will be remembered, however, that the detents 96 ride up the sloping surfaces 97 relatively easily and thereby avoid damage to either the workpiece or to the drill bit 24. The operator then releases the pressure release button 122 and the valve returns to the position shown in FIG. 6, reversing the rotational direction of motor 12 so that the drill bit 24 is driven in the proper direction to function normally.

With the drill bit 24 in contact the work piece 26 and the air motor valve 100 in the forward position, the operator moves the shift lever 20 downwardly to force the feed gear 54 down into driving engagement with the main drive gear 40. The spindle 22 and drill bit 24 are rotated through the spindle rotation gear 62. Also, the feed gear 54 causes the spindle feed gear 68 to rotate at a speed greater than the rotational speed of the spindle 22, and since the spindle feed gear 68 is threaded to the spindle 22, the spindle is fed downwardly in normal feed movement.

The feed movement continues until the collar 70, which has been previously set at the desired depth for the hole, engages the protuberance 76 on the shift lever 20. When this engagement occurs, the shift lever 20 pivots about the pin 74, moves relatively away from the main drive gear 40 and, through the engagement between the tang 78 and the shoulder 60, pulls the feed gear 54 upwardly and out of driving engagement with the main drive gear and into engagement with the stop member 80.

When the feed gear 54 ceases to rotate, the spindle feed gear 68, which is in mesh with the feed gear 54, also stops rotating. When this occurs, the differential in speed between the spindle feed gear 68 and the spindle 22 upon which the spindle feed gear 68 is threaded, causes the spindle to start retracting, that is, moving upwardly in retracting movement.

When the retraction movement reaches the point where the abutment or collar 72 on the spindle 22 engages the lower end of the housing 14, a load is placed on the spindle feed gear 68 causing it to rotate and in turn, rotate the feed gear 54. Rotation of the feed gear 54 causes rotation of the stop member 80 at the same speed. When the speeds are the same, the spindle 22 no longer moves upwardly or downwardly and the stop member 80 simply ratchets past the detents 96. Thus, no damage will be done to the drill 10 in the event that the retraction movement occurs when the operator is not present or if he does not notice that the retraction has been completed.

It should also be pointed out that the feed gear 54 cannot become locked in a neutral position, that is, in the position wherein it is neither in engagement with the main drive gear 40 or with the stop member 80 due to the presence of the detents 90 and the recesses 84 and 86 formed in the shift lever 20.

After the retraction stroke, if it is desired to redrill the hole, or when the drill 10 is moved to another hole, feed movement is again enacted in the drill 10 by depressing the button 122, placing the motor again in reverse so that the drill 10 is in the rapid feed condition as previously described. Thus, each time that a new hole is drilled, production time equal to the difference between time required for rapid feed and time required for normal feed is saved.

From the foregoing detailed description, it should be apparent that the invention described herein presents an improved rapid feed apparatus for automatic feed drills that prevents damage to the drill and work piece during the rapid feeding movement and further, provides an automatic feed drill wherein the use of rapid feed movement substantially reduces production time allowing significantly greater production.

Having described but a single embodiment of the invention, it will be apparent to those skilled in the art that there may be many changes and modifications to this invention without departing from the spirit and scope of the invention.

What is claimed is:

1. Rapid feed apparatus for automatic feed drills including a housing, a rotatable tool spindle located for reciprocating movement in the housing, and driving means located in said housing operably connected with said spindle for rotating and reciprocating said spindle in feeding and retraction movements, said driving means including a spindle rotation gear engaged with said spindle to rotate said spindle and slidable thereon, a spindle feed gear engaged with said spindle to cause the reciprocating movement of said spindle, a main drive gear driven by said drive means and engaged with said spindle rotation gear to cause rotation thereof, and a feed gear engaging said spindle feed gear movable into and out of engagement with said main drive gear, said feed gear, when driven by said main drive gear, causing rotation of said spindle feed gear to move said spindle in normal feeding movement, and, when not driven by said main drive gear, moving said spindle in rapid feed and retraction movement, said apparatus comprising:

shift means connected to said feed gear and engageable with said spindle for moving said feed gear out of driving engagement with said main drive gear;

reversing means operably connected with said motor for reversing the direction of rotation of said motor when said shift means has moved said feed gear out of engagement with said main drive gear for causing said spindle to feed rapidly toward said work piece; and, yieldable stop means in said housing engaging and preventing rotation of said feed gear when said feed gear is moved out of driving engagement with said main drive gear, said stop means being yieldable when a predetermined torque is placed on said feed gear by said spindle feed gear during retraction and rapid feed movement of said spindle whereby said spindle feed gear rotates at the same speed as said spindle thereby stopping the retraction and rapid feed movement of said spindle.

2. The apparatus of claim 1 wherein said reversing means includes:

a source of air under pressures;

a hollow valve body located in said housing;

an elongated valve member moveably located in said valve body and forming an annular space therein connected with said air supply;

resilient means biasing said valve member toward a position wherein said air supply is connected to said motor for driving said motor in a forward direction; and, pressure release means for releasing air pressure on a portion of said valve member whereby said valve member is shifted to a position connecting said air supply to said motor for driving said motor in a reverse direction.

3. The apparatus of claim 2 wherein said stop means includes:

a generally annular stop member disposed in said housing encircling a portion of said shift gear, said stop member including a plurality of circumferentially spaced recesses in the outer periphery thereof and at least one lug engaging said feed gear when said feed gear is in engagement with said stop member; and, at least one resiliently biased stop detent located in said housing and engaging said stop member in one of said recesses, whereby said stop member prevents rotation of said feed gear when said feed gear is in engagement with said stop member causing rapid feed movement of said spindle until torque is applied to said stop member from said spindle to overcome the force exerted on said stop member by said detent whereupon said stop member and feed gear rotate together at the speed of said spindle feed gear to prevent further rapid feed movement of said spindle.

4. The apparatus of claim 3 wherein each said recess in said stop member includes a sloping surface on one side thereof whereby, during rapid feed movement, said detent is displaced more easily by said stop member to avoid damage to said drill.

5. A method of rapid feeding a drill bit in an automatic drill toward a work piece including the steps of:

yieldably locking a feed gear in said automatic drill against rotation;

rotating the motor driving said bit in a direction counter to the direction for drilling with said bit to rapidly feed said bit toward the work piece; and, rotating said feed gear when a predetermined load is imposed on said bit to stop further rapid feed of said bit thereby avoiding damage to said drill.

6. A method of drilling holes in a work piece with an automatic pneumatically powered drill including a rotatable and reciprocable bit comprising the steps of:

rotating said bit;

yieldably locking a feed gear in said drill against rotation;

rotating of the motor in a direction counter to the direction for drilling with said bit to rapidly feed the bit toward the work piece;

rotating said feed gear when a predetermined load is imposed on said bit to stop further rapid feed of said bit;

reversing the direction of motor rotation;

releasing and engaging said feed gear for feeding said bit toward said work piece at drilling speed;

yieldably locking said feed gear against rotation to cause rapid retraction of said bit away from the work piece; and, rotating said feed gear when said predetermined load is imposed on said drill to stop further rapid retraction.

* * * * *